United States Patent [19]

Oudet et al.

[11] Patent Number: 4,866,323
[45] Date of Patent: Sep. 12, 1989

[54] SYNCHRONOUS ELECTRIC MOTOR WITH MAGNETISED ROTOR AND METHOD OF MANUFACTURING THIS MOTOR

[75] Inventors: Claude Oudet, Besancon; Gilbert Drey, La Chaux-De-Fonds; Norbert Veignat, Besancon, all of France

[73] Assignee: Portescap, Chaux-De-Fonds, Switzerland

[21] Appl. No.: 117,200

[22] PCT Filed: Feb. 21, 1986

[86] PCT No.: PCT/CH86/00024
§ 371 Date: Aug. 6, 1987
§ 102(e) Date: Aug. 6, 1987

[87] PCT Pub. No.: WO87/03750
PCT Pub. Date: Jun. 18, 1987

[30] Foreign Application Priority Data
Dec. 6, 1985 [CH] Switzerland ............... 5192/85

[51] Int. Cl.$^4$ ............................................. H02K 1/22
[52] U.S. Cl. .................................... 310/269; 310/114; 310/156; 310/162; 310/179
[58] Field of Search ................. 310/162–165, 310/49 R, 112, 114, 156, 42, 46, 268, 168, 254, 43, 45, 91, 180, 179, 208

[56] References Cited

U.S. PATENT DOCUMENTS

| | | | |
|---|---|---|---|
| 2,797,346 | 6/1957 | Ranseen | 310/46 |
| 3,176,380 | 4/1965 | Wightman | 310/42 |
| 3,469,123 | 9/1969 | Inaba et al. | 310/268 |
| 4,330,727 | 5/1982 | Oudet | 310/268 |
| 4,517,478 | 5/1985 | Oudet | 310/268 |
| 4,658,166 | 4/1987 | Oudet | 310/268 |
| 4,682,067 | 7/1987 | Oudet | 310/268 |

FOREIGN PATENT DOCUMENTS

| | | | |
|---|---|---|---|
| 1282157 | 11/1968 | Fed. Rep. of Germany . | |
| 0002503 | 6/1985 | Int'l Pat. Institute . | |
| 0134599 | 2/1972 | Netherlands . | |
| 0489943 | 6/1970 | Switzerland | 310/268 |

*Primary Examiner*—R. Skudy
*Attorney, Agent, or Firm*—Willian Brinks Olds Hofer Gilson & Lione

[57] ABSTRACT

A synchronous electric motor includes least one flat annular rotor part, magnetized so as to present at least one series of magnetic poles arranged along a flat annular zone of the rotor part. The rotor part is fixed by at least one rotor-supporting part on a shaft of the motor. The motor shaft is mounted for rotation with respect to at least one stator assembly which includes at least two stator parts. The stator parts include pole parts arranged so as to form, in their assembly, an air-gap in which are disposed the magnetic poles of the rotor part. At least one electric control coil being coupled with one or more of the pole parts.

4 Claims, 2 Drawing Sheets

SYNCHRONOUS ELECTRIC MOTOR WITH MAGNETISED ROTOR AND METHOD OF MANUFACTURING THIS MOTOR

The present invention relates to a synchronous electric motor comprising a least one rotor part of essentially flat annular form, magnetised so as to present at least one series of magnetic poles disposed regularly along a planar annular zone, the said rotor part being fixed by means of at least one rotor-supporting part on a motor shaft mounted to be rotatable relatively to at least one stator assembly, the stator assembly comprising at least two stator parts of a magnetically permeable material, these forming, being fast with or being coupled with pole parts arranged so as to form, in their assembly, a variable air gap along at least one portion of an annular space in which are disposed the magnetic poles of the rotor part, the stator assembly comprising, in addition, at least one electric control coil coupled with one or several of the said pole parts. Such a motor is described, for example, in International Patent Application No. WO 85/02503.

The invention has for its object to provide a motor of the aforementioned type, of which the conception, while using usual elements such as standard ball bearings for the mounting of the motor in relation to the stator assembly, facilitates the fabrication of this motor, particularly at the time of assembly, and makes it possible to achieve in a simple and economic fashion a very good precision in the positioning of the rotor part with respect to the stator assembly.

To this end, the motor according to the invention is characterised in that the fixing of the rotor part on the rotor-supporting part is effected in such manner as to permit, when assembling the motor, a positioning of the rotor part in the axial direction and also an angular positioning of this latter relatively to the direction of the motor axis.

Preferably, the stator assembly comprises separate stator parts which form part of a same magnetic circuit, the stator assembly being arranged so as to permit, at the time of assembling the motor, a positioning of the stator parts relatively to one another in the axial direction. In this case, the stator parts which form part of a same magnetic circuit may be interconnected, directly of by means of a yoke part, so as to form a magnetic joint constituted by contact surfaces parallel to the axis of the motor shaft. More particularly, the stator assembly may be formed by two coaxial annular stator parts of like form, each having at least one first and one second cylindrical wall portion, the internal diameter of the first wall portion being equal to the external diameter of the second, the two stator parts being joined in such manner as to be fitted one within the other by the said respective first and second wall portions.

The invention is more particularly applicable to a motor in which the rotor part is present in the form of an annular disc of small thickness with respect to its external diameter and is magnetised axially, and the stator assembly comprises pole parts disposed on both sides of the rotor part.

Preferably, the stator assembly and/or the rotor supporting part comprise at least one access opening communicating with the air space between the rotor part and the pole parts, this opening being accessible from outside the stator unit assembled with the motor shaft provided with the rotor part.

The invention also has for its object a method of fabricating such a motor, in accordance with which, first of all, the motor shaft provided with the rotor-supporting part is assembled with an assembly of pole parts which have to be disposed facing a corresponding flat annular zone of the respective rotor part, in such manner that the ends of these pole parts, in the axial direction, are disposed in a plane perpendicular to the axis of the motor shaft, that the annular rotor part is placed in position by disposing at least one spacer element of a determined thickness between the latter and the ends of at least one part of the said pole parts, that the rotor part is fixed on the rotor support and that the spacer part is withdrawn or removed from the space between the rotor part and the said pole parts. More particularly, the spacer part may be a sheet of thermo-retractable plastic material, a sheet of a material capable of being dissolved in a chemical solvent or a metallic wire of essentially circular form.

Other features of the invention will become apparent from the claims formulated and from the following description of different embodiments given by way of example and illustrated in the accompanying drawing, in which:

FIG. 1 illustrates a first embodiment of a two-phase motor, comprising two stages, each stage representing one of the phases of the motor.

Figure 1:
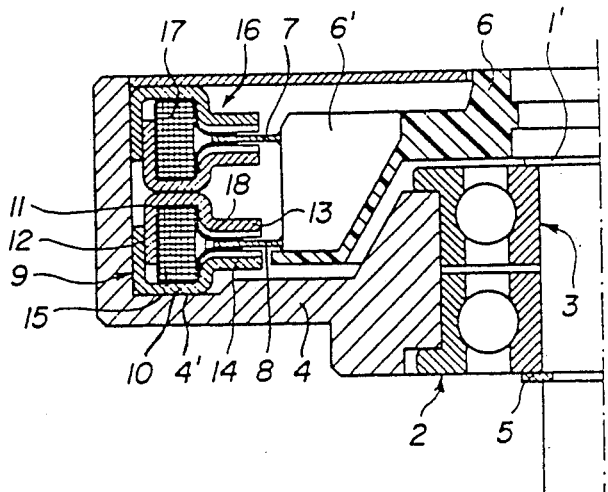
FIG. 1 is an axial section of a first embodiment of the motor according to the invention.

A shaft 1 of the motor is mounted to be rotatable, by means of the two ball bearings 2, 3, in a stator support 4. In order to avoid any axial play of the shaft, the axial play of the ball bearings is taken up and the inner race if these latter is welded onto the shaft or the shaft is fixed by means of a circlip 5 and shims (not shown), disposed between the shaft and the adjoining race of the bearing 2. A shoulder 1' of the shaft 1 serves as support for the inside race of the bearing 3.

A rotor-supporting part 6 of plastic material is made fast with the shaft 1, for example, by casting or moulding, as shown in FIG. 1. This rotor-supporting part has a certain number of ribs 6', for example, twelve in number, of which the peripheral parts are engraved in a cylindrical surface which is coaxial with respect to the shaft 1. Two rotor parts 7, 8, in the form of a thin annular disc, are fixed by bonding on the peripheral parts of the ribs 6', the positioning of these rotor parts being described in greater detail hereafter. The two annular discs 7 and 8 are made, in a manner which is well known, of a magnetisable material such as samarium-cobalt, and they are magnetised axially so as to present magnetic poles on each of their flat surfaces, for example, poles of which the polarity alternates peripherally of the disc.

The stator support 4 has an annular reference surface 4', which is flat and situated in a plane pependicular to the axis of the shaft 1 mounted in the stator support. A first stator assembly 9 comprises a lower stator part 10 and an upper stator part 11 of a magnetically permeable material, these two stator parts being of annular form and having a cylindrical contact surface 12 parallel to the axis of the motor shaft, so as to form a magnetic joint between the parts 10 and 11. The inside parts 13, 14 of the stator parts constitute assemblies of axially spaced polar parts and thus present a toothed profile in the direction of the circumference, so as to form an air-gap of variable height between the parts 13 and 14.

An electric control coil 15 of annular form is disposed between the stator parts 10 and 11 in such manner as to be coupled with the corresponding pole parts. A second stator assembly 16 is arranged in quite a similar manner to the stator assembly 9 and comprises an electric control coil 17. The rotor parts 7 and 8 are respectively disposed in the air-gaps formed by the stator assemblies 16 and 9.

It is also to be seen in FIG. 1 that the stator assembly 16 is resting on the stator assembly 9, a planar annular contact surface being provided for defining the position and particularly the orientation perpendicularly of the axis of the shaft 1 of the stator assembly 16. The stator support 4 comprises a lateral wall, of which the interior cylindrical surface permits the centering of the stator assemblies relatively to the motor shaft. Finally, a cover resting on the stator assembly 16 and closing the housing formed by the stator support 4 can be seen in FIG. 1.

When assembling the motor, the shaft 1 provided with the rotor-supporting part 6 is first of all mounted in the stator support 4 in the manner already referred to above. The lower stator part 10 of the stator assembly 9 is then positioned on the reference surface 4' and a sheet of a heat-retractable plastic material 18 is then placed on the ridges of the toothing of the part 14, which sheet may be of annular form and have a determined thickness, for example, of seven hundredths of a millimeter. Such a heat-retractable material is, for example, ordinary PVC.

The coil 15 is then positioned on the lower part 10 of the stator assembly and the sheet 18 placed in the bottom of this latter. The lower rotor part 8 is then placed on the ridges of the toothing of the part 14, on which ridges is positioned the sheet 18. The rotor part 8 may, to this effect, be displaced freely along the support part 6, i.e. along the peripheral parts of the ribs 6', relatively to which it is centered. The separation sheet 18 thus determines, by its thickness, the axial distance between the rotor part 8 and the part 14 and, in addition, it assures that the rotor part is disposed parallel to the reference surface 4' and thus perpendicular to the axis of the motor shaft.

The sheet 18 is then folded around the coil 15 in such manner that the edge or margin of the sheet 18 is placed on the upper surface of the rotor part 8. The upper part 11 of the stator assembly 9 is then positioned on the sheet 18 covering the coil 15 and the rotor part 8. The sheet 18 thus determines the axial spacing between the rotor part 8 and the part 13 of the stator assembly. In this position, the rotor part 8 is stuck or fixed by another means on the rotor support part 6 and the two stator parts 10 and 11 are also fixed, for example, by adhesion or welding, relatively to one another and relatively to the stator support 4.

The upper stator assembly 16 and the corresponding rotor part 7 are assembled and fixed in a manner simmilar to that which has just been described, the upper surface of the stator part 11 serving as reference surface for the lower part of the stator assembly 16.

When the two stator assemblies and the two rotor parts are fixed in their respective positions, an electric current is caused to pass through the coils 15 and 17 in such a manner as to produce a heating of the plastic sheets surrounding these coils and to cause the retraction of these sheets from the air-gaps of the two stator assemblies.

Instead of using a heat-retractable plastic material, it is also possible to employ a plastic material capable of being dissolved in a suitable chemical solvent, which is introduced into the air-gaps for obtaining the elimination of the plastic material at this position, so that the rotor parts are able to turn freely in the air-gaps.

In order to achieve an adjustment between the two phases of a two-phase motor, the fixing of the upper stator assembly relatively to the stator support is effected once the phase relation relatively to the lower stator assembly has been determined, for example, in the following manner. The rotor is caused to turn and the voltages induced in the coils 15 and 17 are applied to a phasemeter. The angular position of the upper stator assembly 16 is adjusted in order to bring the induced voltages into quadrature. The assembly 16 is then definitively stuck in the stator support 4.

Figure 2:
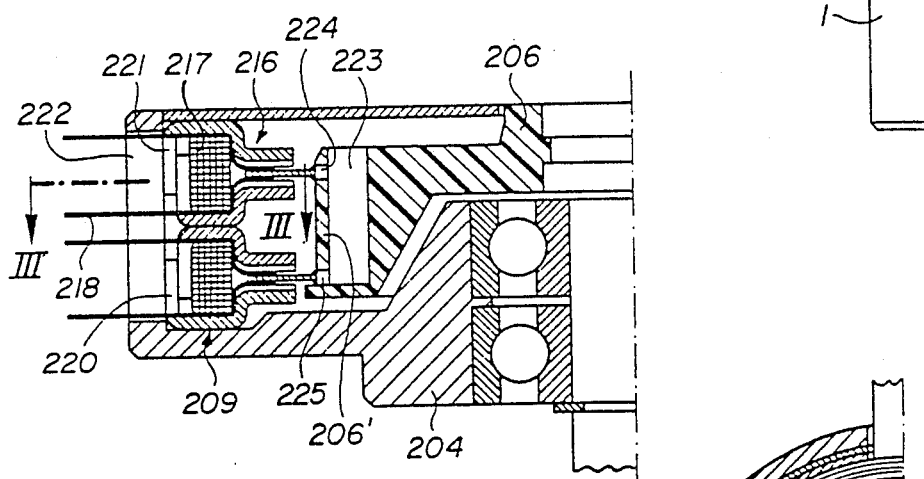
FIG. 2 is an axial section of an embodiment which is similar to that of FIG. 1.
Figure 3:
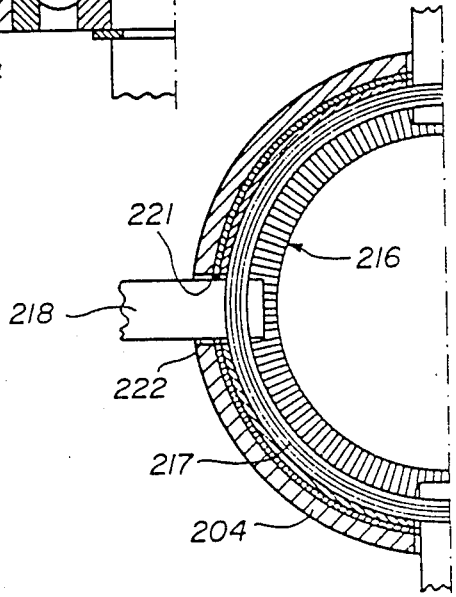
FIG. 3 is a partial sectional view along the line III—III of FIG. 2.

FIG. 2 illustrates another embodiment, which differs from the foregoing in the following respects. The two stator assemblies 209 and 216 and also the side wall of the stator support 204 have radial openings 220, 221 and 222, respectively. These openings can be seen in the top plan view which is shown in FIG. 3 and which represents a section along the line III—III of FIG. 2.

In this embodiment, the annular spacing sheet 18 of FIG. 1 is replaced by sheet portions, in ribbon form, which pass through the openings 220, 221, 222 and can be withdrawn to the exterior when the stator assemblies and the rotor parts have been fixed. These ribbons are, for example, made of a material named "MYLAR" (Trade Mark), so as to form a spacing element of a well established thickness, which can easily be completely removed, because of the high mechanical resistance of this material. In this case, the annular rotor parts rest, for example, on four points of reference corresponding to the respective openings in the assembles and the stator support, as shown in FIG. 3.

The rotor support part 206 according to FIG. 2 has a cylindrical peripheral wall 206' and an upwardly open annular hollow 223. At the height of the annular rotor parts, the wall 206' has radial openings 224, 225 of a section slightly larger than the thickness of the rotor parts. For fixing the rotor parts on the supporting part, the hollow 223 is filled with a suitable adhesive which, on being heated at the moment of fixing, passes through the openings 224, 225 distributed along the periphery of the supporting part and effects an easily controllable adhesion.

Figure 4:
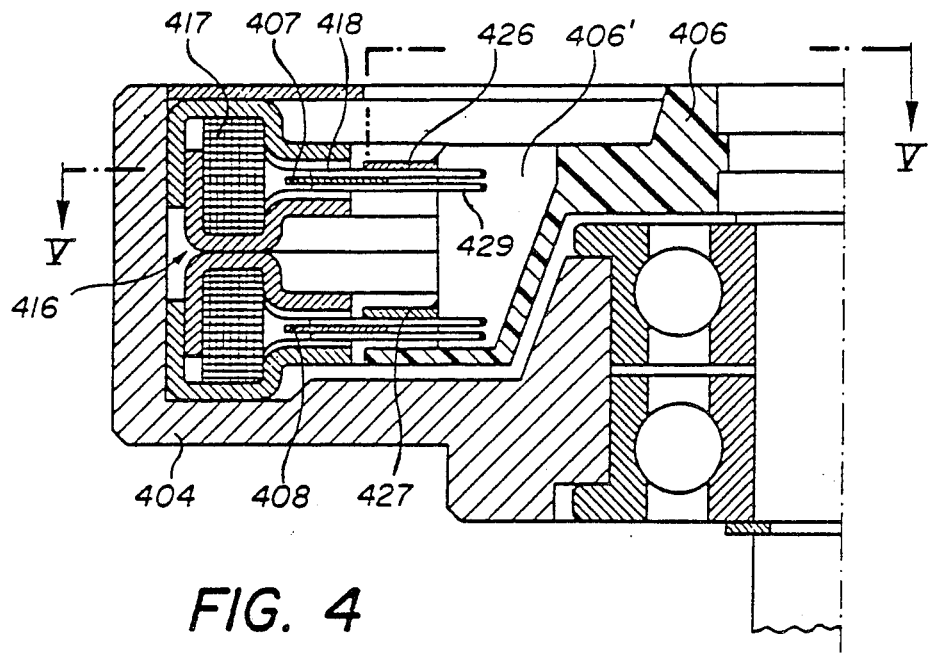
FIG. 4 is an axial section of another embodiment of the motor.
Figure 5:
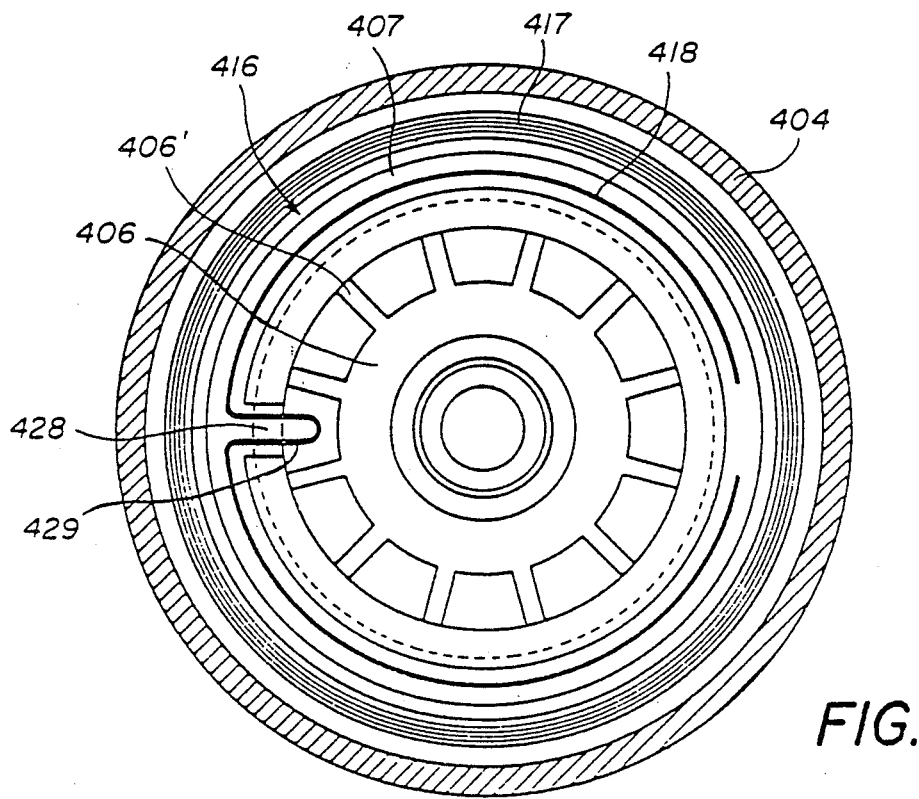
FIG. 5 is a view, partly in section, along the line V—V of FIG. 4.

FIGS. 4 and 5 illustrate another constructional form of the present motor, which has a structure similar to that of FIG. 1. In the assembly according to FIG. 4, a first supporting part 406 is similar to the part 6 in FIG. 1 and presents a series of ribs 406' similar to the ribs 6'. Rotor parts 407 and 408 are stuck on respective second supporting parts 426, 427, which are presented in the form of annular discs, of which the internal diameter corresponds to the external diameter of the cylindrical envelope or shell of the ribs 406'. The rotor parts are fixed beforehand on these supporting parts 426, 427, which will themselves be fixed at the time of the assembly of the motor on the first support part 406. Each supporting part 426, 427 has a radial opening, such as 428, at a location situated between two consecutive ribs 406'. The radial openings 428 communicate with the corresponding air gaps in which the respective rotor parts 407, 408 are located, and accessible from the outside of the stator assembly through the space between the neighboring ribs 406'.

The example of FIG. 4 shows the use, as spacing element corresponding to the sheet 18 or the MYLAR ribbon 218, of a preformed metallic wire, such as 418, having an essentially circular configuration and being disposed between the ridges of the polar parts of each of the stator assemblies and the respective rotor parts. The preferred form of this spacer wire can be seen in FIG. 5. This wire has a loop 429 and is open at a position diametrically opposite to the latter. The loop 429 is positioned so as to pass through the radial opening of the corresponding support part, such as the opening 428 of the part 426, this enabling the wire to be withdrawn by exerting a traction on the loop through the corresponding space between the adjacent ribs of the supporting part 406. The wire 418 is preferably slightly magnetisable, so that, at the time of assembly, it can be positioned and is held in place on the rotor part, this further facilitating the assembly procedure. The diameter of the circle arcs formed by the wire is about equal to the mean diameter of the pole parts of the stator assemblies, such as 416.

The assembly procedure which has just been described in the aforementioned examples and which makes use of the spacing elements between the pole parts and the rotor parts has, in addition to the advantage from the point of view of the facility of the assembly and of the precision of the air spaces between the parts which cooperate magnetically, the advantage that the total air-gap in which is situated a rotor part of given thickness, is a function of this thickness, which is able to vary slightly in a series production. Now the increase in size of the air-gap for a larger magnet thickness compensates to a large degree for the variation in torque per ampere-turn which would be produced with a constant total air-gap, such as that which is obtained by the conventional assembly procedures.

We claim:

1. A synchronous electric motor comprising at least one essentially flat annular rotor part, magnetized so as to present at least one series of magnetic poles arranged regularly along a flat annular zone of said rotor part, said rotor part being fixed by means of least one rotor-supporting part on a shaft of the motor, said motor shaft being mounted for rotation with respect to at least on stator assembly, said stator assembly comprising at least two stator parts of a magnetically permeable material, said stator parts including pole parts arranged so as to form, in their assembly, an air-gap in which are disposed the magnetic poles of said rotor part, at least one electric control coil being coupled with one or more of said pole parts, at least one of said rotor supporting part and said stator assembly having at least one access opening communicating with said air-gap and being accessible from outside of the stator assembly.

2. A motor according to claim 1, wherein the stator assembly comprises separate stator parts forming a magnetic circuit and being coupled to one another along magnetic contact surfaces extending parallely to the direction of the motor shaft.

3. A motor according to claim 1, wherein said rotor-supporting part comprises a plurality of peripheral portions of a surface of revolution coaxial with respect to the motor shaft, said rotor part being fixed to at least one of said peripheral portions.

4. A motor according to claim 1, wherein said rotor-supporting part comprises, in its peripheral part, a plurality of radial opening disposed at the height of the rotor part, so as to permit the passage of an adhesive through these openings for fixing said rotor part on said rotor-supporting part.

* * * * *